(12) United States Patent
Van Mill et al.

(10) Patent No.: US 11,535,316 B2
(45) Date of Patent: Dec. 27, 2022

(54) BRAKE ASSEMBLY FOR A TRACKED VEHICLE

(71) Applicant: Unverferth Manufacturing Company, Inc., Kalida, OH (US)

(72) Inventors: Michael D. Van Mill, Shell Rock, IA (US); Shawn W. Gerdeman, Delphos, OH (US); John Walvatne, Parkersburg, IA (US)

(73) Assignee: Unverferth Manufacturing Co., Inc., Kalida, OH (US)

( * ) Notice: Subject to any disclaimer, the term of this patent is extended or adjusted under 35 U.S.C. 154(b) by 486 days.

(21) Appl. No.: 16/601,966

(22) Filed: Oct. 15, 2019

(65) Prior Publication Data

US 2021/0107575 A1    Apr. 15, 2021

(51) Int. Cl.
| | |
|---|---|
| *B62D 55/06* | (2006.01) |
| *B62D 55/14* | (2006.01) |
| *B62D 55/32* | (2006.01) |
| *F16D 55/225* | (2006.01) |
| *B62D 55/10* | (2006.01) |
| *B60T 1/06* | (2006.01) |
| *B60T 17/22* | (2006.01) |
| *A01D 90/10* | (2006.01) |

(52) U.S. Cl.
CPC .............. *B62D 55/06* (2013.01); *B60T 1/065* (2013.01); *B60T 17/221* (2013.01); *B62D 55/10* (2013.01); *B62D 55/14* (2013.01); *B62D 55/32* (2013.01); *F16D 55/225* (2013.01); *A01D 90/10* (2013.01)

(58) Field of Classification Search
CPC ........ B62D 55/06; B62D 55/10; B62D 55/14; B62D 55/12; B60T 1/065; B60T 17/221; F16D 55/225; F16D 55/228; F16D 55/00; F16D 55/02; F16D 55/226; F16D 55/224; F16D 55/28; F16D 51/20; F16D 2051/003; F16D 2055/0008; F16D 2121/02; F16D 2250/0084
See application file for complete search history.

(56) References Cited

U.S. PATENT DOCUMENTS

| | | | | |
|---|---|---|---|---|
| 4,817,746 A | * | 4/1989 | Purcell | ................. B62D 55/305 |
| | | | | 180/9.1 |
| 4,881,609 A | * | 11/1989 | Purcell | ............... B62D 55/0842 |
| | | | | 180/9.5 |
| 6,907,946 B1 | * | 6/2005 | Buckley | ............... B62D 55/125 |
| | | | | 188/38 |

(Continued)

*Primary Examiner* — Jacob D Knutson
*Assistant Examiner* — Abigail R Hymel
(74) *Attorney, Agent, or Firm* — Rothwell, Figg, Ernst & Manbeck, P.C.

(57) ABSTRACT

A farm implement is provided having a frame and first and second track assemblies. The first track assembly has a first track frame, a first idler wheel, and a first brake assembly. The first idler wheel has an inboard side facing toward and an outboard side facing away from a center the first track frame. The first brake assembly has a first disc coupled to the first idler wheel on the outboard side of the first idler wheel, a first caliper couplable to first and second sides of the first disc, and a first torque arm coupled to the first track frame and a spindle of the first idler wheel. The first caliper is mounted on the first torque arm, and is configured to clamp down on the first and second sides of the first disc in order to slow and/or stop rotation of the first idler wheel.

20 Claims, 8 Drawing Sheets

(56) References Cited

U.S. PATENT DOCUMENTS

2005/0183907 A1* 8/2005 Maher .................. F16D 65/567
  188/72.7
2005/0206237 A1* 9/2005 Scheetz .................. B62D 55/14
  305/9

* cited by examiner

BRAKE ASSEMBLY FOR A TRACKED VEHICLE

FIELD OF THE DISCLOSURE

This disclosure relates generally to farm implements, and more particular, to brake assemblies for a tracked vehicle.

BACKGROUND

Tracked vehicles, or vehicles with one or more track assemblies, are common. One use of such vehicles is for agriculture, where farm implements may employ track assemblies.

Mobile farm implements may include track assemblies to support the frame and allow a tow vehicle such as a tractor to move the farm implement. Other farm implements may include track assemblies and be self-propelled. Mobile farm implements such as grain carts, seed tenders, and sprayers are used in fields, for example, in which the terrain may be uneven.

Typical braking assemblies for track assemblies have brake components (such as brake discs) mounted on the inboard side (or inside) of the wheel. This makes installation, service, and repair difficult, labor intensive, and complex, as it requires removing wheels or releasing tension in a belt surrounding the track assembly in order to install, service, or repair the brake assembly. Inspection, ventilation, and debris removal are also impaired with the brake components being mounted on the inboard side.

SUMMARY

Accordingly, there is a need to provide an improved brake assembly for tracked vehicles. Embodiments herein disclosed provide for, among other things, having the braking assembly located on the outboard side (or outside) of the wheel. This, in combination with other disclosed features, provides advantages including a much less labor intensive and less complex installation, service, and/or repair, as it does not require removing wheels or releasing tension in a belt surrounding the track assembly in order to install, service, or repair the brake assembly. For example, removing the idler wheel and/or releasing tension of the track belt may require going through a track belt alignment process requiring additional time and resources. The ease of installation, service, and repair also allows for the brake assembly to be manufactured and sold as an add-on component to a tracked vehicle (such as a farm implement). This provides greater flexibility to the manufacturer of the track assembly and/or tracked vehicle, the dealer, and the end-user or customer, and also requires less inventory on hand. For example, some regions may require brakes on tracked vehicles by ordinance, some regions may consider brakes to be a high-volume sale option, and other regions may exhibit little interest in brake assemblies. By being able to provide the brake assembly as an add-on feature, localized market conditions may be harnessed by manufacturers and dealers to provide better service to end-users or customers.

According to a first aspect, a farm implement is provided. The farm implement includes a frame; and first and second track assemblies for assisting in moving the farm implement along a ground surface in a line of travel. The first track assembly and the second track assembly are positioned on opposite lateral sides of a central longitudinal axis of the frame. The first track assembly has a first track frame, a first idler wheel, and a first brake assembly. The first idler wheel has an inboard side facing toward a center of the first track frame and an outboard side facing away from the center of the first track frame. The first brake assembly has a first disc coupled to the first idler wheel on the outboard side of the first idler wheel, a first caliper couplable to first and second sides of the first disc, and a first torque arm coupled to the first track frame and a spindle of the first idler wheel. The first caliper is mounted on the first torque arm, and the first caliper is configured to clamp down on the first and second sides of the first disc in order to slow and/or stop rotation of the first idler wheel.

In some embodiments, the first track assembly further has a second idler wheel and a second brake assembly; the second idler wheel has an inboard side facing toward the center of the first track frame and an outboard side facing away from the center of the first track frame; the second brake assembly has a second disc coupled to the second idler wheel at the outboard side of the second idler wheel, a second caliper couplable to first and second sides of the second disc, and a second torque arm coupled to the first track frame and a spindle of the second idler wheel; and the second caliper is mounted on the second torque arm, and the second caliper is configured to clamp down on the first and second sides of the second disc in order to slow and/or stop rotation of the second idler wheel.

In some embodiments, the second track assembly has a second track frame, a third idler wheel, and a third brake assembly; the third idler wheel has an inboard side facing toward the center of the second track frame and an outboard side facing away from the center of the second track frame; the third brake assembly has a third disc coupled to the third idler wheel on the outboard side of the third idler wheel, a third caliper couplable to first and second sides of the third disc, and a third torque arm coupled to the second track frame and a spindle of the third idler wheel; the third caliper is mounted on the third torque arm, and the third caliper is configured to clamp down on the first and second sides of the third disc in order to slow and/or stop rotation of the third idler wheel; the second track assembly further has a fourth idler wheel and a fourth brake assembly; the fourth idler wheel has an inboard side facing toward the center of the second track frame and an outboard side facing away from the center of the second track frame; the fourth brake assembly has a fourth disc coupled to the fourth idler wheel at the outboard side of the fourth idler wheel, a fourth caliper couplable to first and second sides of the fourth disc, and a fourth torque arm coupled to the second track frame and a spindle of the fourth idler wheel; and the fourth caliper is mounted on the fourth torque arm, and the fourth caliper is configured to clamp down on the first and second sides of the fourth disc in order to slow and/or stop rotation of the fourth idler wheel.

In some embodiments, any one or more of the spindles of the first, second, third, and fourth idler wheels is fixed to the respective first or second track frame such that it does not rotate with rotation of the idler wheel.

According to a second aspect, a track assembly for a farm implement is provided. The track assembly includes a track frame; a first idler wheel having an inboard side facing toward a center of the track frame and an outboard side facing away from the center of the track frame; and a first brake assembly having a first disc coupled to the first idler wheel on the outboard side of the first idler wheel, a first caliper couplable to first and second sides of the first disc, and a first torque arm coupled to the track frame and a spindle of the first idler wheel. The first caliper is mounted on the first torque arm, and the first caliper is configured to clamp down on the first and second sides of the first disc in order to slow and/or stop rotation of the first idler wheel.

In some embodiments, the track assembly further has a second idler wheel and a second brake assembly; the second idler wheel has an inboard side facing toward the center of the track frame and an outboard side facing away from the center of the track frame; the second brake assembly has a second disc coupled to the second idler wheel at the outboard side of the second idler wheel, a second caliper couplable to first and second sides of the second disc, and a second torque arm coupled to the track frame and a spindle of the second idler wheel; and the second caliper is mounted on the second torque arm, and the second caliper is configured to clamp down on the first and second sides of the second disc in order to slow and/or stop rotation of the second idler wheel.

According to a third aspect, a method of installing brake assemblies on a track assembly for a farm implement is provided. The track assembly has a track frame and a first idler wheel, and the first idler wheel has an inboard side facing toward a center of the track frame and an outboard side facing away from the center of the track frame. The method includes mounting a first brake assembly to the track assembly, wherein mounting the first brake assembly comprises: (1) coupling a first disc to the first idler wheel at the outboard side of the first idler wheel, (2) coupling a first torque arm to the track frame and a spindle of the first idler wheel, and (3) installing a first caliper such that it is couplable to first and second sides of the first disc. The first caliper is mounted on the first torque arm, and the first caliper is configured to clamp down on the first and second sides of the first disc in order to slow and/or stop rotation of the first idler wheel.

In some embodiments, the track assembly further has a second idler wheel and the second idler wheel has an inboard side facing toward the center of the track frame and an outboard side facing away from the center of the track frame. The method may further include mounting a second brake assembly to the track assembly, wherein mounting the second brake assembly comprises: (1) coupling a second disc to the second idler wheel at the outboard side of the second idler wheel, (2) coupling a second torque arm to the track frame and a spindle of the second idler wheel, and (3) installing a second caliper such that it is couplable to first and second sides of the second disc. The second caliper is mounted on the second torque arm, and the second caliper is configured to clamp down on the first and second sides of the second disc in order to slow and/or stop rotation of the second idler wheel. In some embodiments, mounting the first and second brake assemblies to the track assembly is performed without removing the first or second idler wheels and/or without releasing tension in a belt surrounding the track assembly.

According to a fourth aspect, a method of servicing brake assemblies of a track assembly is provided. The track assembly has a track frame and a first idler wheel and the first idler wheel has an inboard side facing toward a center of the track frame and an outboard side facing away from the center of the track frame. The method includes servicing a first brake assembly of the track assembly, wherein servicing the first brake assembly comprises: (1) checking a first disc coupled to the first idler wheel at the outboard side of the first idler wheel, (2) checking a first torque arm coupled to the track frame and a spindle of the first idler wheel, and (3) checking a first caliper that is couplable to first and second sides of the first disc. The first caliper is mounted on the first torque arm, and the first caliper is configured to clamp down on the first and second sides of the first disc in order to slow and/or stop rotation of the first idler wheel.

In some embodiments, the track assembly further has a second idler wheel and a second brake assembly and the second idler wheel has an inboard side facing toward the center of the track frame and an outboard side facing away from the center of the track frame. The method may further include servicing a second brake assembly of the track assembly, wherein servicing the second brake assembly comprises: (1) checking a second disc coupled to the second idler wheel at the outboard side of the second idler wheel, (2) checking a second torque arm coupled to the track frame and a spindle of the second idler wheel, and (3) checking a second caliper that is couplable to first and second sides of the second disc. The second caliper is mounted on the second torque arm, and the second caliper is configured to clamp down on the first and second sides of the second disc in order to slow and/or stop rotation of the second idler wheel. In some embodiments, servicing the first and second brake assemblies of the track assembly is performed without removing the first or second idler wheels and/or without releasing tension in a belt surrounding the track assembly.

According to a fifth aspect, a brake assembly kit is provided, the kit being mountable to a track assembly having a track frame and a first idler wheel having an inboard side facing toward a center of the track frame and an outboard side facing away from the center of the track frame. The brake assembly kit includes: a disc couplable to the first idler wheel on the outboard side of the first idler wheel; a caliper couplable to first and second sides of the disc; and a torque arm couplable to the track frame and a spindle of the first idler wheel. The caliper is mountable on the torque arm, and the caliper is configured to clamp down on the first and second sides of the disc when mounted on the torque arm, in order to slow and/or stop rotation of the first idler wheel.

According to a sixth aspect, a farm implement is provided. The farm implement includes a frame; and first and second track assemblies for assisting in moving the farm implement along a ground surface in a line of travel. The first track assembly and the second track assembly are positioned on opposite lateral sides of a central longitudinal axis of the frame. The first track assembly has a first track frame, a first idler wheel, and a first brake assembly. The first idler wheel has an inboard side facing toward a center of the first track frame and an outboard side facing away from the center of the first track frame. The first brake assembly has a first brake drum coupled to the first idler wheel on the outboard side of the first idler wheel, a first brake shoe assembly capable of engaging an inner surface of the first brake drum, and a first torque arm coupled to the first track frame and a spindle of the first idler wheel. The first brake shoe assembly is mounted on the first torque arm, and the first brake shoe assembly is configured to engage against the inner surface of the first brake drum in order to slow and/or stop rotation of the first idler wheel.

According to a seventh aspect, a track assembly for a farm implement is provided. The track assembly includes a track frame; and a first idler wheel having an inboard side facing toward a center of the track frame and an outboard side facing away from the center of the track frame. The track assembly is configured to receive a first brake assembly such that when the first brake assembly is received the first brake assembly has a first disc coupled to the first idler wheel on the outboard side of the first idler wheel, a first caliper couplable to first and second sides of the first disc, and a first torque arm coupled to the track frame and a spindle of the first idler wheel, wherein the first caliper is mounted on the first torque arm, and the first caliper is configured to clamp down on the first and second sides of the first disc in order to slow and/or stop rotation of the first idler wheel.

In some embodiments, the spindle of the first idler wheel is longer than a spindle of another idler wheel of the track assembly. In some embodiments, the track assembly further includes first torque arm coupled to the track frame.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
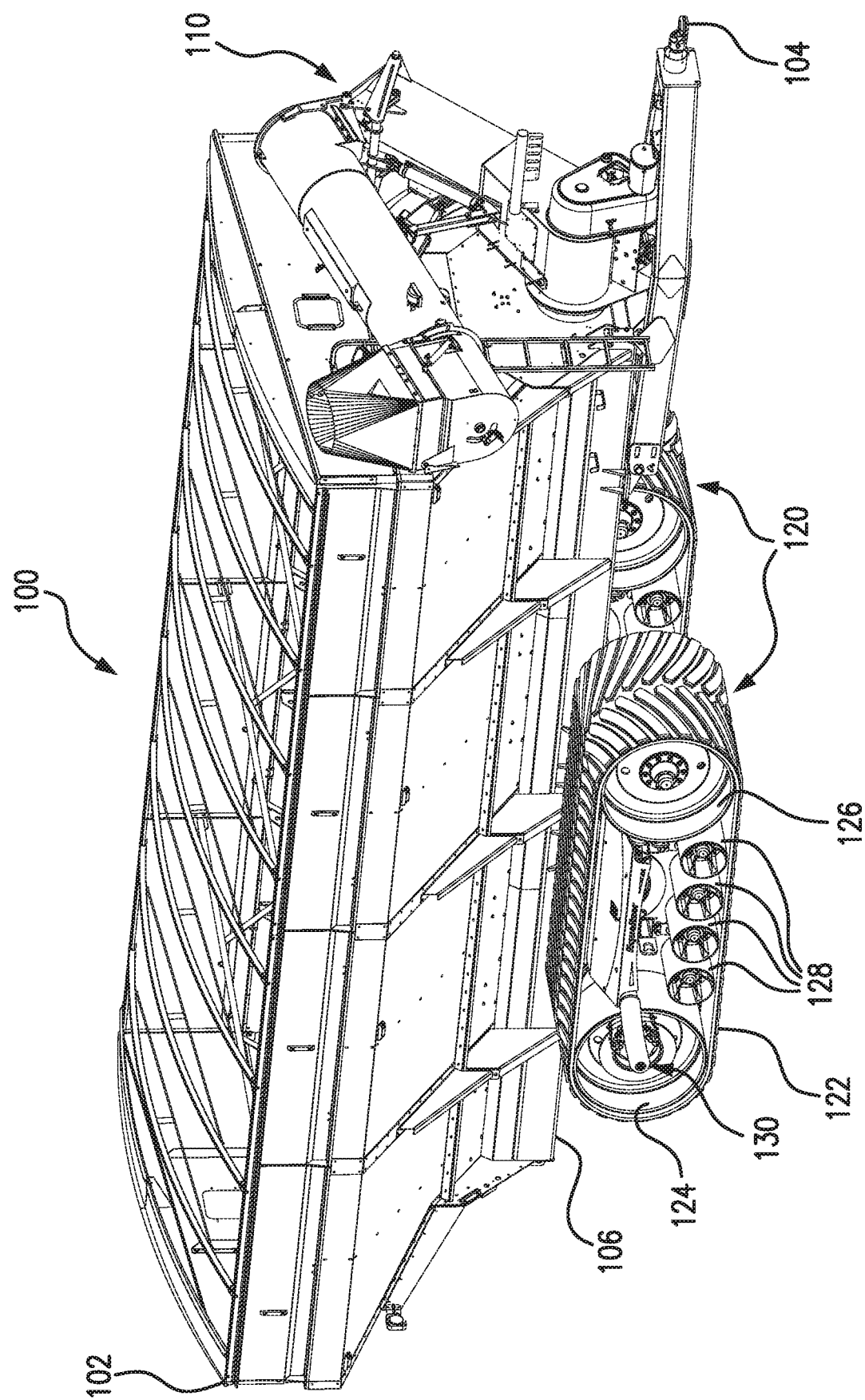
FIG. 1 is a perspective view of a farm implement according to an embodiment.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

FIG. 1 depicts a side perspective view of a grain cart 100 according to one embodiment of the present disclosure. Grain cart 100 includes a grain holding container or hopper 102 mounted on a frame 106 with track assemblies 120 positioned on opposite lateral sides of a central longitudinal axis of frame 106. The grain cart 100 also includes an auger assembly 110 for conveying agricultural material and a hitch 104 for towing the grain cart 100. In some embodiments, there may be more or fewer track assemblies 120 than as shown. For example, there may be a single track assembly 120 on either side of the farm implement, or there may be multiple track assemblies 120 (e.g., two track assemblies 120) on each side of the farm implement.

The hopper 102 may include fronts wall or sides, laterally opposed side walls, and a rear wall or side, which together define a grain holding space with an open top and a bottom. An intake or receiving portion of the auger assembly 110 may form a sump proximate the base or bottom of the hopper 102 to draw grain from the bottom of the hopper 102 into the auger assembly 110.

As shown, auger assembly 110 is in a folded (or stored) position. Auger assembly 110 may be unfolded to an operating position, in which the auger assembly 110 extends upwardly from the intake portion to a discharge portion laterally and forwardly spaced from the hopper 102 to facilitate discharge of grain from the auger assembly 110 into another container such as, for instance, another grain cart, semi-trailer, or rail car located to the side of the grain cart 100. Embodiments disclosed herein may include other types of auger assemblies, or even no auger assembly at all. Examples of auger assemblies applicable to embodiments disclosed herein include U.S. Pat. Nos. 8,702,368; 9,039, 340; 9,102,478; 9,216,681; 9,272,653; 9,706,713; 9,723, 789, and 9,848,536; the disclosure of each of which is hereby incorporated in its entirety.

Each of the track assemblies 120 includes idler wheels 124, 126; bogie wheels 128; and a track belt 122 looped around the idler wheels 124, 126 and configured to make contact with a ground surface. Each of the track assemblies 120 also includes a brake assembly 130. Embodiments disclosed herein may include other types of track assemblies, and the brake assembly 130 may be used with other types of track assemblies than what is shown. Examples of track assemblies applicable to embodiments disclosed herein include U.S. Pat. Nos. 9,457,850; and 9,457,854, the disclosure of each of which is hereby incorporated in its entirety.

Figure 2:
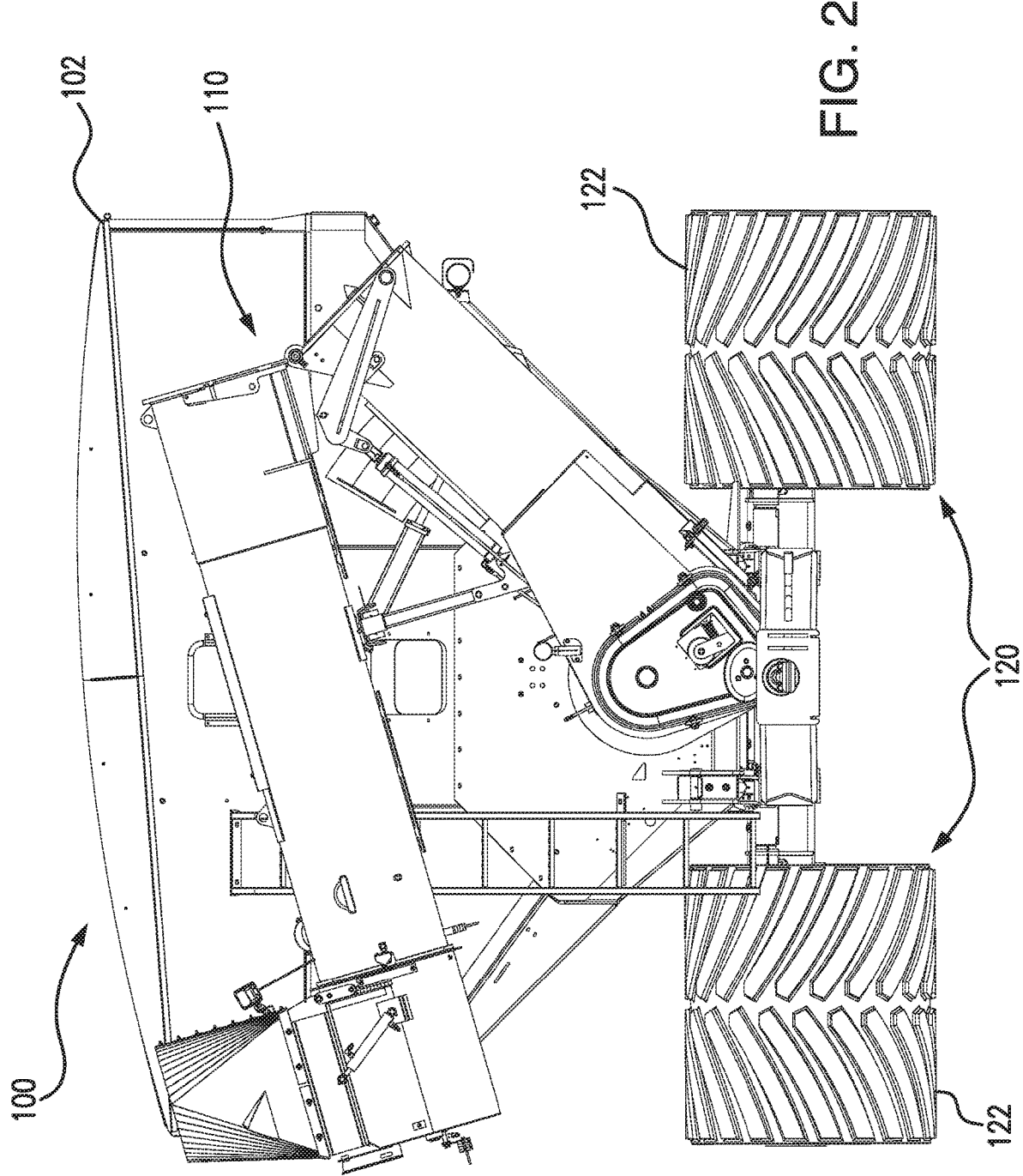
FIG. 2 is a front view of a farm implement according to an embodiment.

FIG. 2 depicts a front view of a grain cart 100 according to one embodiment of the present disclosure. As shown in FIG. 2, the track assemblies 120 are symmetric with respect to a center longitudinal axis of grain cart 100. In particular, the brake assembly 130 (see FIG. 1) is provided in each of the track assemblies 120. In some embodiments, a left-side track assembly and a right-side track assembly be of different types, and may have different embodiments of the disclosed brake assembly 130.

Figure 3:
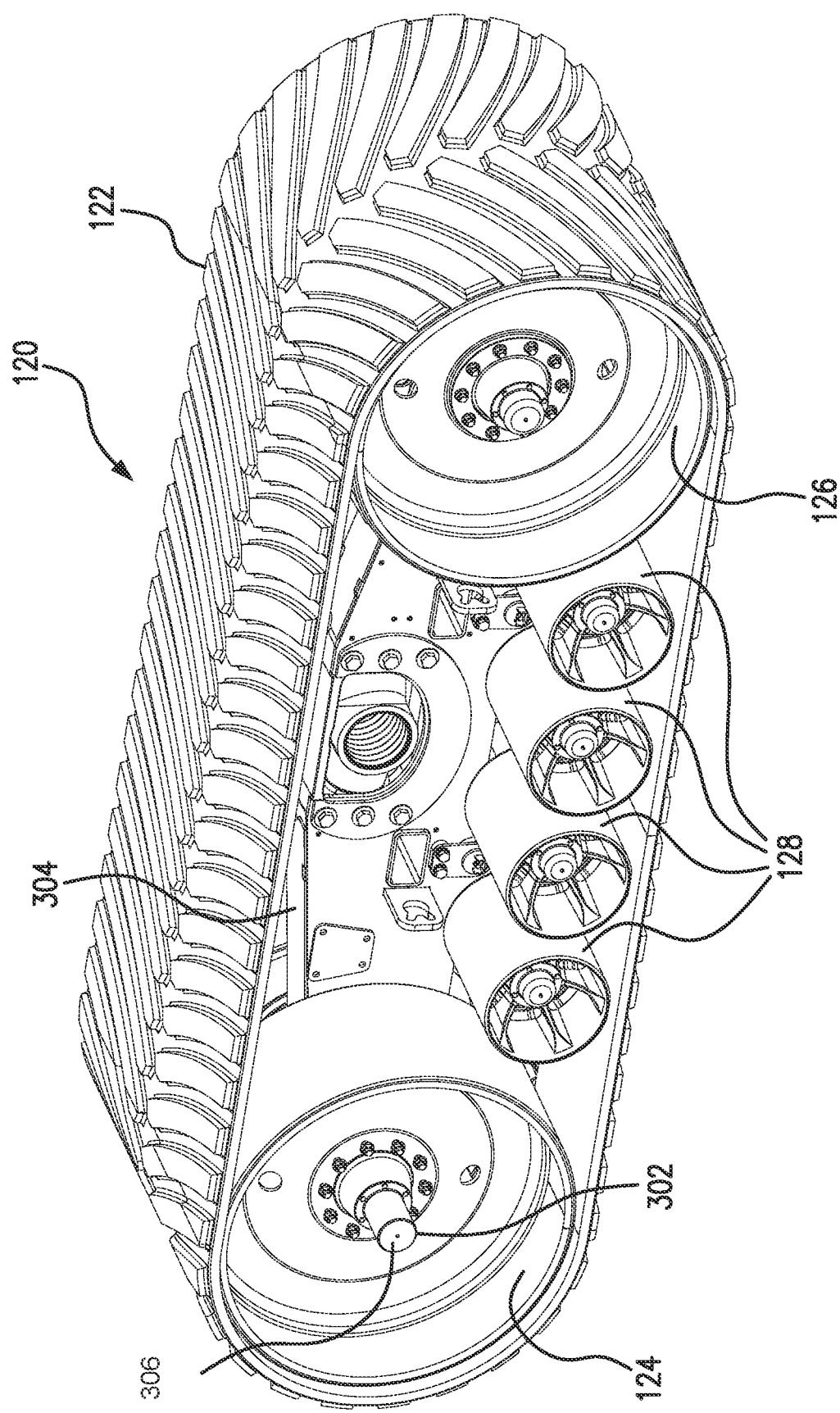
FIG. 3 is a side perspective view of a track assembly according to an embodiment.

FIG. 3 depicts a side perspective view of a track assembly 120 according to one embodiment of the present disclosure. Track assembly 120 may include a track frame 304. For example, track frame 304 may support the idler wheels 124, 126 and the bogey wheels 128, each of which may be mounted to track frame 304. Track frame 304 may be coupled to frame 106 of the grain cart 100, such that track frame 304 supports frame 106. In some embodiments, track frame 304 is pivotably coupled to frame 106 so that track frame 304 can pivot with respect to frame 106. The brake assembly 130 is not shown in FIG. 3 in order to better show spindle 302. As shown, a hub cap 306 (see also 604 in FIG. 6) is placed over spindle 302. The spindle 302 on idler wheel 124 extends further outward of the wheel hub than the corresponding spindle for idler wheel 126. This allows, in some embodiments, for the brake assembly 130 to be more easily installed on track assembly 120. In particular, the spindle 302 extends further outward to better support the torque arm 400 (shown in FIG. 4). In some embodiments, spindle 302 may be fixed, such that it does not rotate with respect to the track frame 304.

Track assembly 120 may be used in grain cart 100, in another type of farm implement, or in any other type of tracked vehicle.

Figure 4:
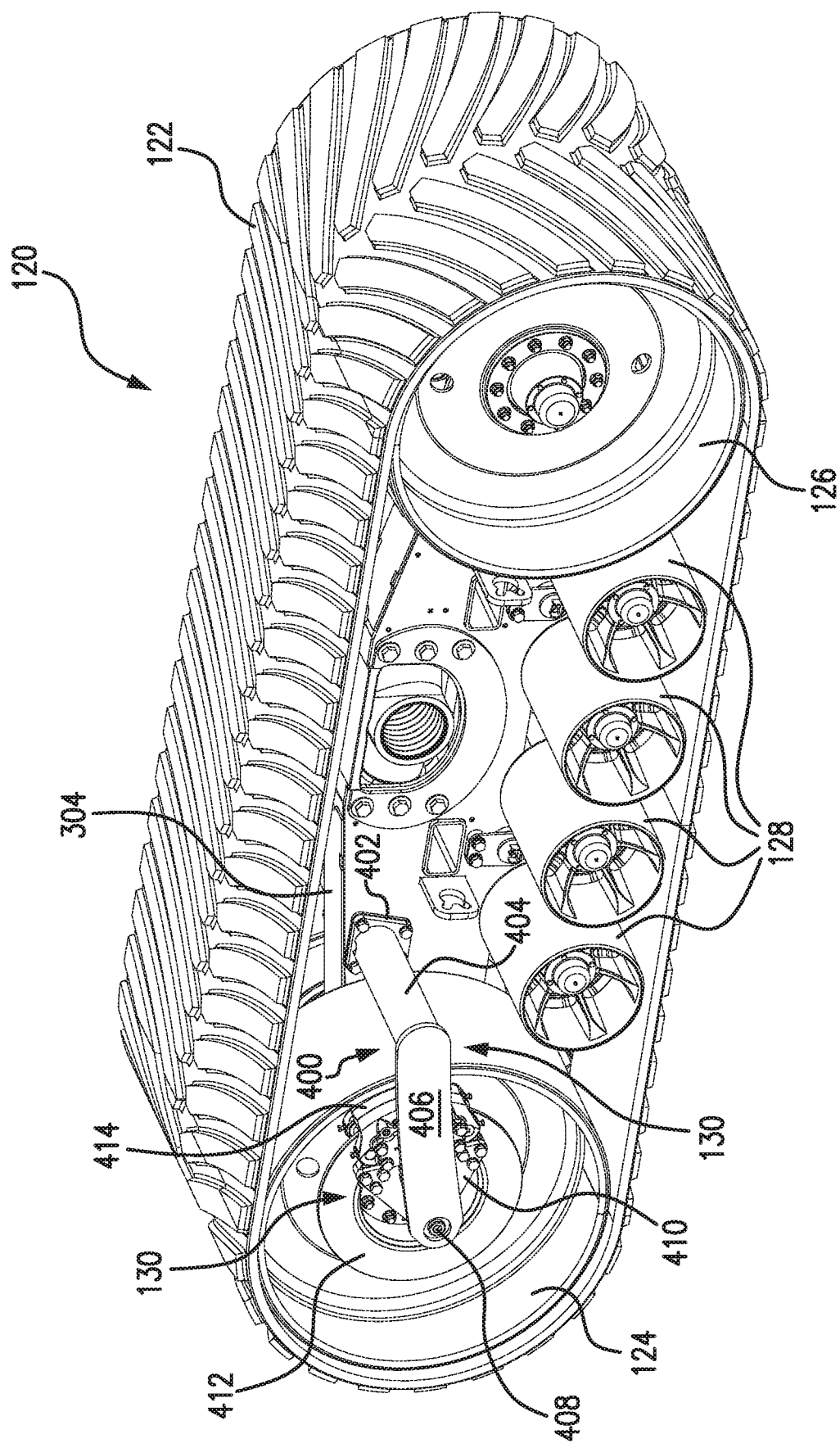
FIG. 4 is a side perspective view of a track assembly according to an embodiment.

FIG. 4 depicts a side perspective view of a track assembly 120 according to one embodiment of the present disclosure. FIG. 4 shows the same view as in FIG. 3, except that the brake assembly 130 is shown in FIG. 4. Brake assembly 130 comprises a torque arm 400, a disc or brake rotor 412, and a caliper 414. Torque arm 400 has a frame mounting member 402. As shown, frame mounting member 402 may mount to track frame 304, for example, by four bolts that extend through frame mounting member 402 and into track frame 304. Other types of mounting may also be employed. In embodiments, frame mounting member 402 is removably mounted to track frame 304, such that frame mounting member 402 and the brake assembly 130 may be removed from the track frame 304. Such removable mounting may be contrasted with a fixed mounting, such as welding, which does not readily allow for the brake assembly 130 to be removed. In some embodiments, brake assembly 130 may be removed in order to facilitate service and/or repair of the brake assembly 130, or installation of another brake assembly 130.

Figure 5:
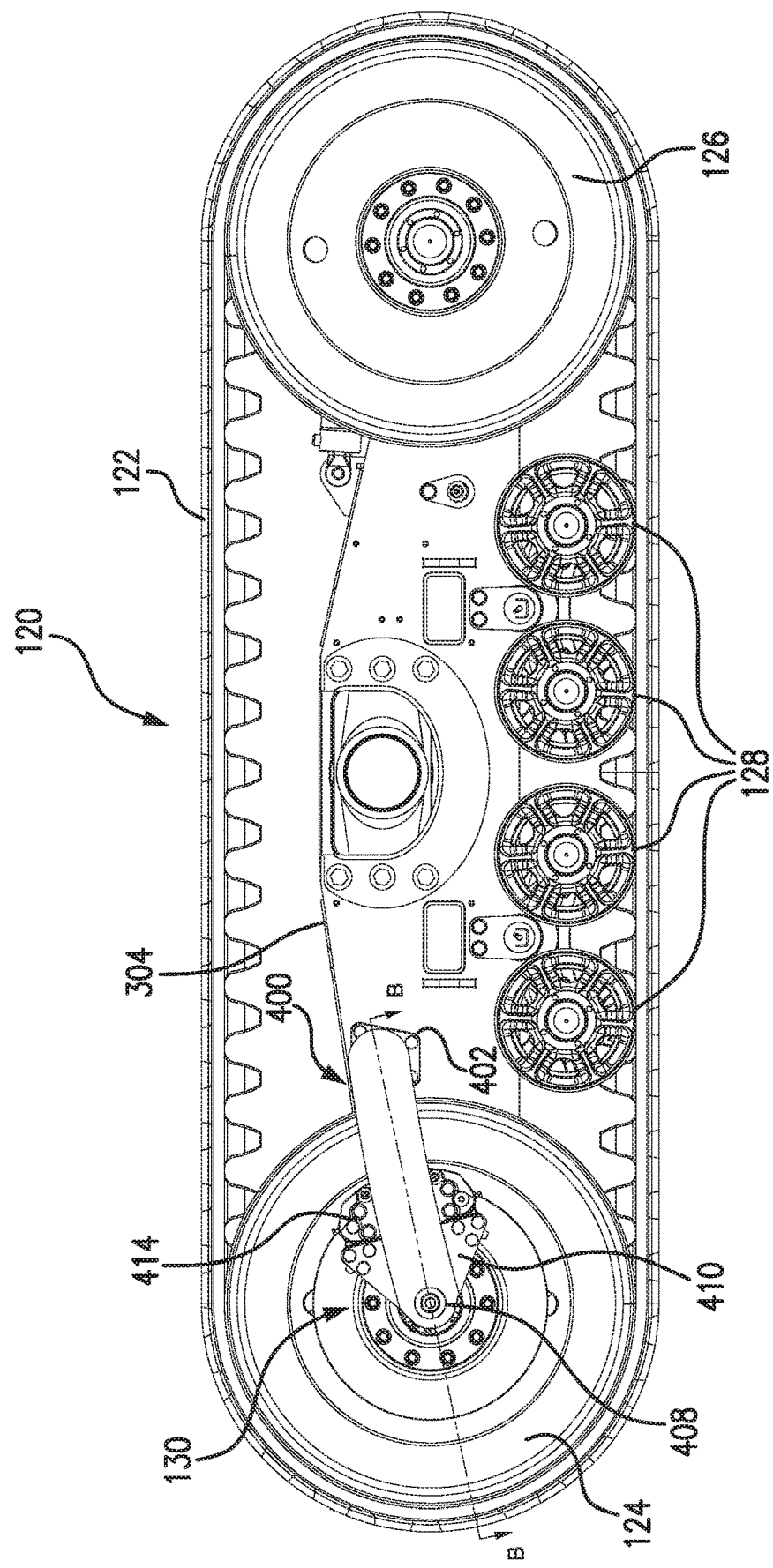
FIG. 5 is a side view of a track assembly according to an embodiment.

Torque arm 400 also includes a transverse arm 404, a lateral arm 406, a spindle mounting member 408, and a caliper mounting member 410. As shown in FIG. 4, transverse arm 404 projects outwardly from mounting member 402 in a direction substantially orthogonal to mounting member 408 and track frame 304. Transverse arm 404 connects to lateral arm 406, which is coupled to idler wheel 124, and specifically to spindle 302 (see FIG. 3), by the spindle mounting member 408. In some embodiments, the transverse arm 404 and lateral arm 406 are connected by fasteners. Spindle mounting member 408 may accept an end of spindle 302 (see FIG. 3) in order to support the torque arm 400 and couple it from the track frame 304 to the spindle 302 (see FIG. 3) of idler wheel 124. Additionally, the caliper 414 is mounted to the caliper mounting member 410 to further support the torque arm 400 and couple the torque arm 400 from caliper 414 to the track frame 304. As shown, caliper mounting member 410 has a generally triangular shape (including rounded edges), as seen from a side view (such as shown in FIG. 5). Caliper mounting member 410 may mount to caliper 414 by bolts that extend through caliper mounting member 410 and into caliper 414. Other types of mounting may also be employed. In embodiments, caliper 414 is removably mounted to caliper mounting member 410, such that caliper 414 may be removed from caliper mounting member 410.

Disc or brake rotor 412 is coupled to idler wheel 124. As shown disc or brake rotor 412 is circularly shaped, and may be mounted to idler wheel 124 such that disc or brake rotor 412 rotates with idler wheel 124. Caliper 414 may be mounted to the torque arm 400, such as by caliper mounting member 410. Caliper 414 may be configured to engage with disc or brake rotor 412, such as by engaging with opposing sides of disc or brake rotor 412 in order to slow and/or stop rotation of the idler wheel 124, which may cause the movement of the track belt 122 to slow or stop e.g. by friction between the idler wheel and the inside of the track belt 122. Disc or brake rotor 412 has some thickness, which as shown is substantially less than a diameter of the disc or brake rotor 412. The sides of the disc or brake rotor 412 which caliper 414 clamps down on refer to opposing faces of the disc or brake rotor 412. In embodiments, pressurized fluid may cause the caliper to clamp down on the disc or brake rotor 412. In some embodiments, the pressurized fluid may cause the caliper 414 to allow the disc or brake rotor 412 to rotate. In some embodiments, the clamping actuation may be electrical.

While particular examples of torque arm 400, disc or brake rotor 412, and caliper 414 have been illustrated and described, it is to be understood that embodiments disclosed herein may also employ additional and/or alternate configurations of such elements. For example, torque arm 400 may be mounted to track frame 304 and/or spindle 302 using other mounting mechanisms; torque arm 400 may include additional components, or components having a different shape, such as a curved arm connected between track frame 304 and spindle 302; and/or caliper 414 may have a different shape and be configured to clamp down on a smaller or larger area of disc or brake rotor 412. In some embodiments, disc or brake rotor 412 may be mounted to the idler wheel hub 602; and, in some embodiments, spindle 302 may include a splined end to connect to the torque arm 400, e.g. to assist with the torque arm forces. These and other variations are considered to be within the scope of disclosed embodiments.

Each track assembly 120 have idler wheels on either side of track frame 304. For example, there may be a first idler wheel 124 on a first side of track frame 304 and a second idler wheel 124 on a second side of track frame 304. This can be seen, in part, from the perspective view shown in FIG. 4. Embodiments may further include a brake assembly 130 mounted on each of the idler wheels 124. Additionally, or alternatively, brake assemblies 130 may be mounted on one or more of idler wheels 126. That is, each of the idler wheels 124, 126 (or a subset thereof) may include a brake assembly 130 mounted to it. In some embodiments, the brake assembly 130 may be mounted only to a front idler wheel 126, only to a rear idler wheel 124, or to both front and rear idler wheels 124, 126. In some embodiments, brake assembly 130 may be mounted to a rear idler wheel 124 on the first side of track frame 304 while another brake assembly 130 may be mounted to a front idler wheel 126 on the second side of track frame 304. Generally, brake assembly 130 may be mounted to one or more of the idler wheels 124, 126. For a given track assembly 120, the different brake assemblies 130 may be of substantially the same type and configuration, or they may be different. For example, other embodiments of brake assemblies herein disclosed, including brake assembly 730 discussed in relation with FIGS. 7 and 8 may be one of the brake assemblies included on track assembly 120.

As shown in FIG. 4, brake assembly 130 is mounted to an outboard side of idler wheel 124 facing away from the center of the track frame 304. The inboard side of the idler wheel 124 faces toward the center of the track frame 304. Prior art brake assemblies have typically been mounted on the inboard side, which has made installation, service, and repair of such brake assemblies more difficult. The outboard side is a direction relative to both the idler wheel and the track frame. For example, the outboard side of the idler wheel 124 on a first side of track frame 304 is different from the outboard side of the idler wheel 124 on a second side of track frame 304.

FIG. 5 depicts a side view of a track assembly 120 according to one embodiment of the present disclosure. Line B-B is shown, extending parallel to the lateral arm 406 of the torque arm 400. As shown, frame mounting member 402 of torque arm 400 is positioned at a level above spindle 302 (see FIG. 3) and spindle mounting member 408, thereby causing lateral arm 406 to be disposed at an angle with respect to the direction of travel of track assembly 120. In some embodiments, the position of frame mounting member 402 relative to spindle 302 (see FIG. 3) and spindle mounting member 408 may be such that lateral arm 406 is level or is disposed at a different angle such as an angle causing the lateral arm 406 to slope downwards toward a center of track assembly 120.

Figure 6:
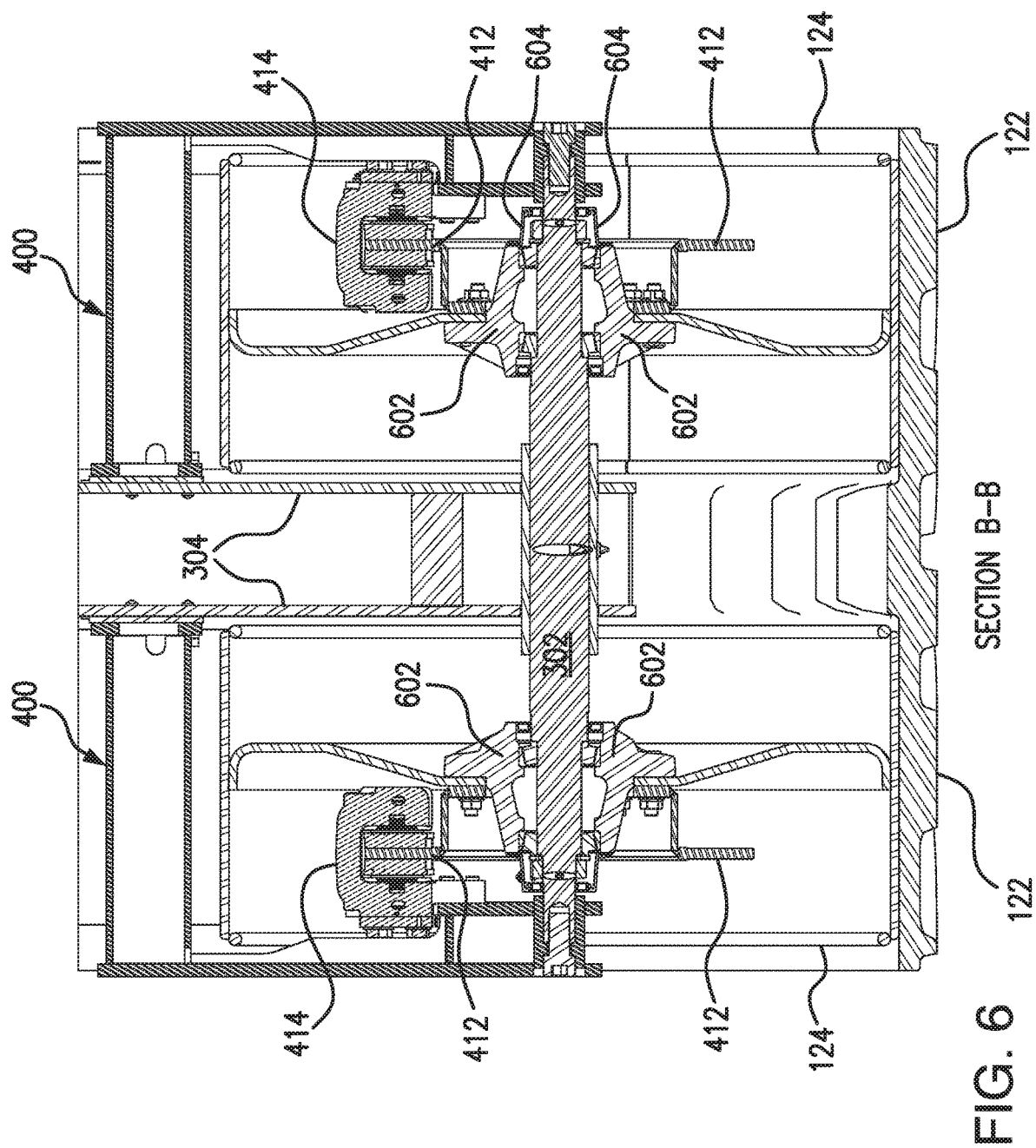
FIG. 6 is a cross-section of the side view shown in FIG. 5 taken along line B-B.

FIG. 6 depicts a cross-section view of a track assembly 120 according to one embodiment of the present disclosure. The cross-section view is taken along line B-B of FIG. 5. FIG. 6 illustrates an idler hub 602 of idler wheel 124 also having a hub cap 604.

The hub cap 604 used for idler wheels for which there is a brake assembly mounted, or which are configured to have a brake assembly mounted, may be different from (or alternatively may be interchangeable with) hub caps used for idler wheels without a brake assembly mounted, or which are not configured to have a brake assembly mounted. For example, the hub cap 604 may include more depth then the hub cap of an idler wheel where no brake assembly mounted or configured to be mounted, such that the hub cap covers the whole spindle 302. In other embodiments, the hub cap may be substantially similar to or interchangeable with the hub cap of an idler wheel where no brake assembly mounted or configured to be mounted. In some embodiments, the hub cap may include a grease or oil seal allowing one or more ends of spindle 302 to be exposed for connection to the torque arm 400. Where the hub cap for use on an idler wheel supporting a brake assembly is the same or substantially the same as any other hub cap, the spindle may be left exposed but could in some embodiments include a coating on the spindle to prevent rust.

Figure 7:
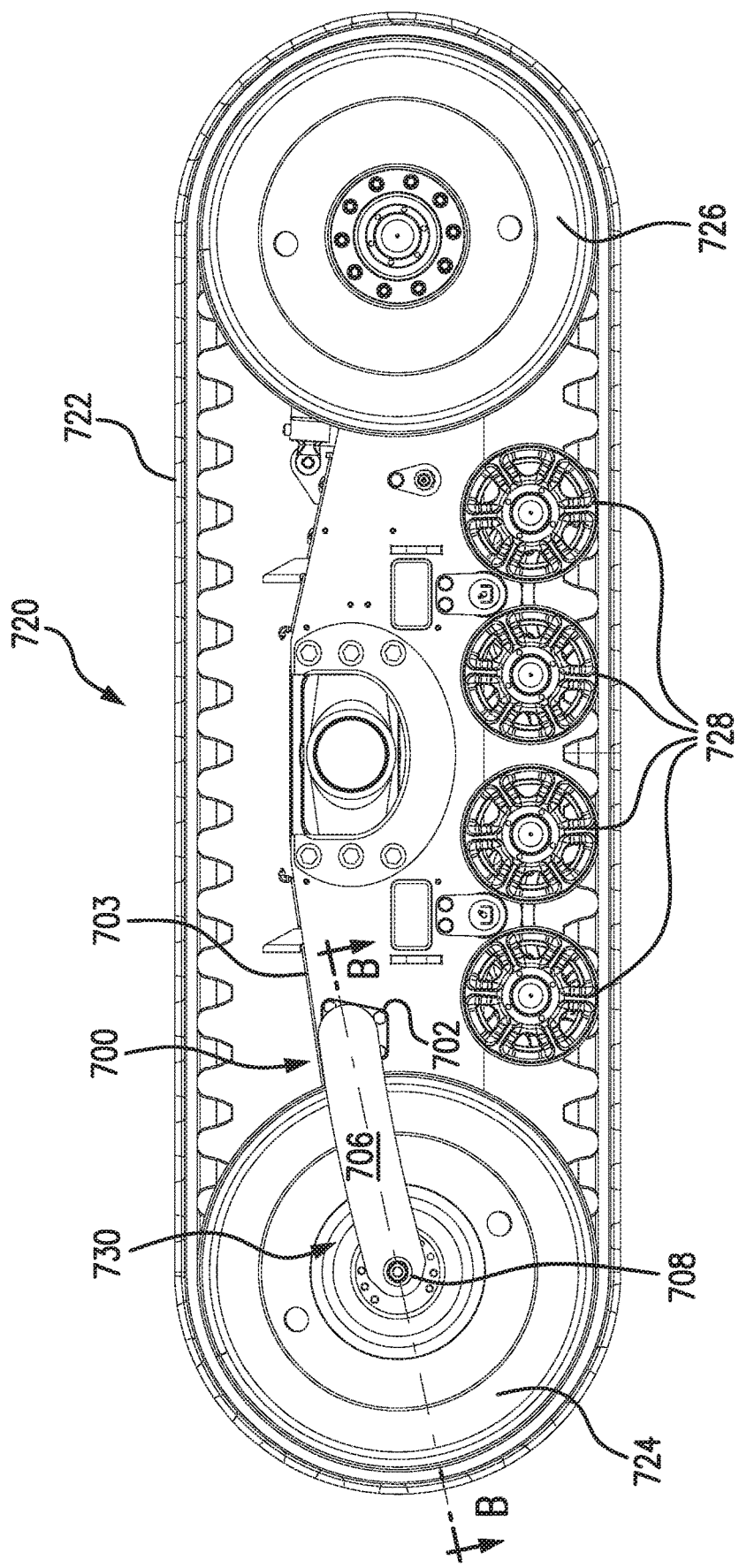
FIG. 7 is a side view of a track assembly according to an embodiment.

FIG. 7 depicts a side view of a track assembly 720 according to one embodiment of the present disclosure. Track assembly 720 discloses an alternate embodiment where a drum-type brake is employed instead of a disc-type brake. Like track assembly 120, track assembly 720 includes idler wheels 724, 726; bogie wheels 728; and a track belt 722 looped around the idler wheels 724, 726. Track assembly 720 also includes a brake assembly 730 and track frame 703. As shown in FIG. 7, brake assembly 730 includes a torque arm 700 having a lateral arm 706, frame mounting member 702, and spindle mounting member 708. A transverse arm corresponding to the transverse arm 404 of track assembly 120 is not shown, but may be included in some embodiments. Unless otherwise described, the corresponding components of brake assembly 130 are similar to those of brake assembly 730, and the corresponding description of those components apply. One difference with brake assembly 130 is that a caliper is not needed in the drum-type brake assembly 730. Accordingly, there is no caliper corresponding to caliper 414 or caliper mounting member corresponding to caliper mounting member 410 shown for brake assembly 730. Instead of using a caliper, the drum-style brake assembly 730 employs a brake shoe 812 and brake drum 810 to cause a breaking force (see FIG. 8).

In FIG. 7, line B-B is shown, extending parallel to the lateral arm 706 of the torque arm 700. As shown, frame mounting member 702 of torque arm 700 is positioned at a level above spindle 302 (see FIG. 3) and spindle mounting member 708, thereby causing lateral arm 706 to be disposed at an angle with respect to the direction of travel of track assembly 720. In some embodiments, the position of frame mounting member 702 relative to spindle 302 (see FIG. 3) and spindle mounting member 708 may be such that lateral arm 706 is level or is disposed at a different angle such as an angle causing the lateral arm 706 to slope downwards toward a center of track assembly 720.

Figure 8:
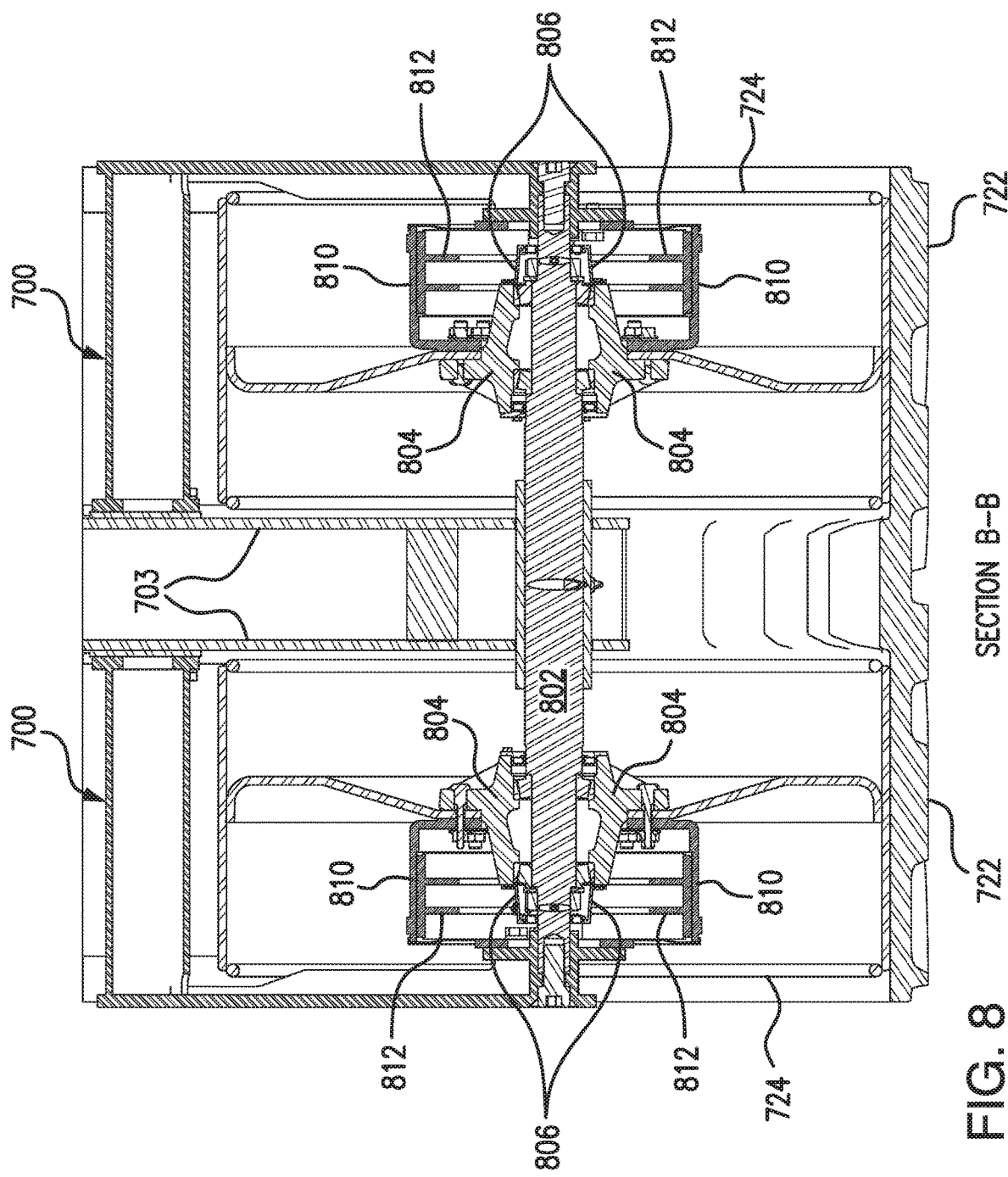
FIG. 8 is a cross-section of the side view shown in FIG. 7 taken along line B-B.

FIG. 8 depicts a cross-section view of a track assembly 720 according to one embodiment of the present disclosure. The cross-section view is taken along line B-B of FIG. 7. FIG. 8 illustrates an idler hub 804 of idler wheel 724 also having a hub cap 806 and spindle 802. Brake drum 810 is mounted onto and rotates with the idler wheel 724 and/or idler hub 804. The brake drum 810 wraps around the outer surface of brake shoe 812. Compared to the disc-type brake system of brake assembly 120, brake drum 810 plays a similar role to disc or brake rotor 412. Brake shoe 812 may include an actuator mounted to the torque arm 700. For example, the actuator may be part of a brake shoe assembly, and the actuator may be indirectly mounted to the torque arm 700 by being mounted to the brake shoe assembly where the brake shoe assembly is mounted to the torque arm 700. Fluid pressure on the actuator pushes the brake shoe 812 outward, pressing the shoe 812 against an inner surface of the brake drum 810. Compared to the disc-type brake system of brake assembly 120, brake shoe 812 plays a similar role as caliper 414. The brake shoe 812 may be mounted on the torque arm 700, and the brake shoe 812 is configured to engage against the inner surface of the brake drum 810 in order to slow and/or stop rotation of the idler wheel 724.

Exemplary embodiments showing a disc-type brake assembly 130 and a drum-type brake assembly 730 have been shown. Other types of brake assemblies, including electric brakes, clutch pack brakes, and mechanical brakes, and brake assemblies combining one or more of these types are also within the scope of disclosed embodiments. In each of these types of brake assemblies, a torque arm (e.g., such as torque arm 400 and/or torque arm 700) may be used to mount the brake assembly on the outboard side of an idler wheel.

In some embodiments, the idler wheel 124, 126 on which a brake assembly (e.g. brake assembly 130, brake assembly 730) is mounted, or which is configured to be mounted by such a brake assembly, may be a hub piloted idler wheel. A hub piloted idler wheel means that the hub has an a step on the hub's outer surface that an inner surface of the idler wheel fits over (e.g., tightly fits over). This may allow, in some embodiments, for the idler wheel nuts to be removed (e.g., to install, service, or repair the disc or brake rotor 412 or the brake drum 810) without de-tensioning the track belt or completely removing the idler wheel. In other embodiments, the disc or brake rotor 412 or brake drum 810 may be attached to the idler wheel in such a way that it uses some or all of the idler wheel mounting fasteners, or it may be attached to the idler hub via separate fasteners.

Embodiments disclosed herein allow for and enable improved installation, servicing, and repair. Examples of servicing a brake assembly (e.g. brake assembly 130, brake assembly 730) may include replacement of one or more components or sub-components of the brake assembly, such as replacement of caliper 414 (or of brake pads of caliper 414) or brake shoe 812 (or of brake shoe liners of brake shoe 812). Such replacement (or other servicing) may be performed without de-tensioning of the track belt or removal of the idler wheel. With regard to the disc-type brake assembly 130, brake pads may be replaced without having to remove the torque arm 400; with regard to the drum-type brake assembly 730, torque arm 400 may need to be removed in order to replace brake shoe liners; but in both cases, replacement could be performed without having to de-tension the track belt or remove the idler wheel. Likewise, with regard to the disc-type brake assembly 130, wheel mounting nuts may be replaced without having to remove the torque arm 400; with regard to the drum-type brake assembly 730, torque arm 400 may need to be removed in order to replace wheel mounting nuts; but in both cases, replacement could be performed without having to de-tension the track belt or remove the idler wheel As part of installation, servicing, and/or repair of a brake assembly, it may be useful to inspect the brake assembly (including inspecting components and sub-components of the brake assembly). Such inspection may be performed without de-tensioning of the track belt or removal of the idler wheel. It may also be useful to service or repair a brake assembly by cleaning the brake assembly, such as cleaning out or removing debris (e.g. agricultural material or field crop material such as corn stalks). Removal of this type of debris helps improve ventilation that affects brake temperature, and can help deter starting fires as well as extend brake component life. Accordingly, it is advantageous to perform such cleaning, and particularly to be able to do so (as provided by embodiments disclosed herein) without de-tensioning of the track belt or removal of the idler wheel.

In the case of drum-type brake assemblies, commonly there is some adjustment to the brake shoe liner engagement of the drum after installation. This adjustment is significantly improved (e.g. it is easier, less time consuming, cheaper to perform) where the brake assembly in an outboard installation location. This is because, for instance, adjustment on an inboard location would have to done by reaching into a mostly blind area located under the track belt, behind and between the idler wheel and the track frame and above the track frame.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:
1. A farm implement comprising:
a frame;
first and second track assemblies for assisting in moving the farm implement along a ground surface in a line of travel;
wherein the first track assembly and the second track assembly are positioned on opposite lateral sides of a central longitudinal axis of the frame;
the first track assembly having a first track frame, a first idler wheel, and a first brake assembly;
the first idler wheel having an inboard side facing toward a center of the first track frame and an outboard side facing away from the center of the first track frame;
the first brake assembly having a first disc coupled to the first idler wheel on the outboard side of the first idler wheel, a first caliper couplable to first and second sides of the first disc, and a first torque arm coupled to the first track frame and a spindle of the first idler wheel; and
wherein the first caliper is mounted on the first torque arm, and the first caliper is configured to clamp down on the first and second sides of the first disc in order to slow and/or stop rotation of the first idler wheel.

2. The farm implement of claim 1,
wherein the first track assembly further has a second idler wheel and a second brake assembly;
the second idler wheel having an inboard side facing toward the center of the first track frame and an outboard side facing away from the center of the first track frame;
wherein the second brake assembly has a second disc coupled to the second idler wheel at the outboard side of the second idler wheel, a second caliper couplable to first and second sides of the second disc, and a second torque arm coupled to the first track frame and a spindle of the second idler wheel; and
wherein the second caliper is mounted on the second torque arm, and the second caliper is configured to clamp down on the first and second sides of the second disc in order to slow and/or stop rotation of the second idler wheel.

3. The farm implement of claim 1,
the second track assembly having a second track frame, a third idler wheel, and a third brake assembly;
the third idler wheel having an inboard side facing toward the center of the second track frame and an outboard side facing away from the center of the second track frame;

the third brake assembly having a third disc coupled to the third idler wheel on the outboard side of the third idler wheel, a third caliper couplable to first and second sides of the third disc, and a third torque arm coupled to the second track frame and a spindle of the third idler wheel;

wherein the third caliper is mounted on the third torque arm, and the third caliper is configured to clamp down on the first and second sides of the third disc in order to slow and/or stop rotation of the third idler wheel;

wherein the second track assembly further has a fourth idler wheel and a fourth brake assembly;

the fourth idler wheel having an inboard side facing toward the center of the second track frame and an outboard side facing away from the center of the second track frame;

wherein the fourth brake assembly has a fourth disc coupled to the fourth idler wheel at the outboard side of the fourth idler wheel, a fourth caliper couplable to first and second sides of the fourth disc, and a fourth torque arm coupled to the second track frame and a spindle of the fourth idler wheel; and wherein the fourth caliper is mounted on the fourth torque arm, and the fourth caliper is configured to clamp down on the first and second sides of the fourth disc in order to slow and/or stop rotation of the fourth idler wheel.

4. The farm implement of claim 1, wherein the spindle of the first idler wheel is fixed to the first track frame such that the spindle of the first idler wheel does not rotate with rotation of the first idler wheel.

5. A track assembly for a farm implement, the track assembly comprising:

a track frame;

a first idler wheel having an inboard side facing toward a center of the track frame and an outboard side facing away from the center of the track frame; and a first brake assembly having a first disc coupled to the first idler wheel on the outboard side of the first idler wheel, a first caliper couplable to first and second sides of the first disc, and a first torque arm coupled to the track frame and a spindle of the first idler wheel, wherein the first caliper is mounted on the first torque arm, and the first caliper is configured to clamp down on the first and second sides of the first disc in order to slow and/or stop rotation of the first idler wheel.

6. The track assembly of claim 5, wherein the track assembly further has a second idler wheel and a second brake assembly;

the second idler wheel having an inboard side facing toward the center of the track frame and an outboard side facing away from the center of the track frame;

wherein the second brake assembly has a second disc coupled to the second idler wheel at the outboard side of the second idler wheel, a second caliper couplable to first and second sides of the second disc, and a second torque arm coupled to the track frame and a spindle of the second idler wheel; and wherein the second caliper is mounted on the second torque arm, and the second caliper is configured to clamp down on the first and second sides of the second disc in order to slow and/or stop rotation of the second idler wheel.

7. A method of installing brake assemblies on a track assembly for a farm implement, wherein the track assembly has a track frame and a first idler wheel, and the first idler wheel has an inboard side facing toward a center of the track frame and an outboard side facing away from the center of the track frame, the method comprising:

mounting a first brake assembly to the track assembly, wherein mounting the first brake assembly comprises: (1) coupling a first disc to the first idler wheel at the outboard side of the first idler wheel, (2) coupling a first torque arm to the track frame and a spindle of the first idler wheel, and (3) installing a first caliper such that the first caliper is couplable to first and second sides of the first disc, and wherein the first caliper is mounted on the first torque arm, and the first caliper is configured to clamp down on the first and second sides of the first disc in order to slow and/or stop rotation of the first idler wheel.

8. The method of claim 7, wherein the track assembly further has a second idler wheel and the second idler wheel has an inboard side facing toward the center of the track frame and an outboard side facing away from the center of the track frame, the method further comprising:

mounting a second brake assembly to the track assembly, wherein mounting the second brake assembly comprises: (1) coupling a second disc to the second idler wheel at the outboard side of the second idler wheel, (2) coupling a second torque arm to the track frame and a spindle of the second idler wheel, and (3) installing a second caliper such that the second caliper is couplable to first and second sides of the second disc, and wherein the second caliper is mounted on the second torque arm, and the second caliper is configured to clamp down on the first and second sides of the second disc in order to slow and/or stop rotation of the second idler wheel.

9. The method of claim 8, wherein mounting the first and second brake assemblies to the track assembly is performed without removing the first or second idler wheels and/or without releasing tension in a belt surrounding the track assembly.

10. The method of claim 8, further comprising mounting a third brake assembly to a second track assembly, wherein the track assembly has a second track frame and a third idler wheel, and the third idler wheel has an inboard side facing toward a center of the second track frame and an outboard side facing away from the center of the second track frame wherein mounting the third brake assembly comprises: (1) coupling a third disc to the third idler wheel at the outboard side of the third idler wheel, (2) coupling a third torque arm to the second track frame and a spindle of the third idler wheel, and (3) installing a third caliper such that the third caliper is couplable to first and second sides of the third disc, and wherein the third caliper is mounted on the third torque arm, and the third caliper is configured to clamp down on the first and second sides of the third disc in order to slow and/or stop rotation of the third idler wheel.

11. The method of claim 7, wherein mounting the first brake assembly to the track assembly is performed without removing the first idler wheel and/or without releasing tension in a belt surrounding the track assembly.

12. A method of servicing brake assemblies of a track assembly, wherein the track assembly has a track frame and a first idler wheel and the first idler wheel has an inboard side facing toward a center of the track frame and an outboard side facing away from the center of the track frame, the method comprising:

servicing a first brake assembly of the track assembly, wherein servicing the first brake assembly comprises:

(1) checking a first disc coupled to the first idler wheel at the outboard side of the first idler wheel, (2) checking a first torque arm coupled to the track frame and a spindle of the first idler wheel, and (3) checking a first caliper that is couplable to first and second sides of the first disc, and wherein the first caliper is mounted on the first torque arm, and the first caliper is configured to clamp down on the first and second sides of the first disc in order to slow and/or stop rotation of the first idler wheel.

13. The method of claim 12, wherein the track assembly further has a second idler wheel and a second brake assembly and the second idler wheel has an inboard side facing toward the center of the track frame and an outboard side facing away from the center of the track frame, the method further comprising:

servicing a second brake assembly of the track assembly, wherein servicing the second brake assembly comprises: (1) checking a second disc coupled to the second idler wheel at the outboard side of the second idler wheel, (2) checking a second torque arm coupled to the track frame and a spindle of the second idler wheel, and (3) checking a second caliper that is couplable to first and second sides of the second disc, and wherein the second caliper is mounted on the second torque arm, and the second caliper is configured to clamp down on the first and second sides of the second disc in order to slow and/or stop rotation of the second idler wheel.

14. The method of claim 13, wherein servicing the first and second brake assemblies of the track assembly is performed without removing the first or second idler wheels and/or without releasing tension in a belt surrounding the track assembly.

15. The method of claim 12, wherein servicing the first brake assembly of the track assembly is performed without removing the first idler wheel and/or without releasing tension in a belt surrounding the track assembly.

16. A brake assembly kit mountable to a track assembly having a track frame and a first idler wheel having an inboard side facing toward a center of the track frame and an outboard side facing away from the center of the track frame, the brake assembly kit comprising:

a disc couplable to the first idler wheel on the outboard side of the first idler wheel;

a caliper couplable to first and second sides of the disc; and a torque arm couplable to the track frame and a spindle of the first idler wheel;

wherein the caliper is mountable on the torque arm, and the caliper is configured to clamp down on the first and second sides of the disc when mounted on the torque arm, in order to slow and/or stop rotation of the first idler wheel.

17. A farm implement comprising:

a frame;

first and second track assemblies for assisting in moving the farm implement along a ground surface in a line of travel;

wherein the first track assembly and the second track assembly are positioned on opposite lateral sides of a central longitudinal axis of the frame;

the first track assembly having a first track frame, a first idler wheel, and a first brake assembly;

the first idler wheel having an inboard side facing toward a center of the first track frame and an outboard side facing away from the center of the first track frame;

the first brake assembly having a first brake drum coupled to the first idler wheel on the outboard side of the first idler wheel, a first brake shoe assembly capable of engaging an inner surface of the first brake drum, and a first torque arm coupled to the first track frame and a spindle of the first idler wheel; and wherein the first brake shoe assembly is mounted on the first torque arm, and the first brake shoe assembly is configured to engage against the inner surface of the first brake drum in order to slow and/or stop rotation of the first idler wheel.

18. A track assembly for a farm implement, the track assembly comprising:

a track frame; and a first idler wheel having an inboard side facing toward a center of the track frame and an outboard side facing away from the center of the track frame, wherein the track assembly is configured to receive a first brake assembly such that when the first brake assembly is received the first brake assembly has a first disc coupled to the first idler wheel on the outboard side of the first idler wheel, a first caliper couplable to first and second sides of the first disc, and a first torque arm coupled to the track frame and a spindle of the first idler wheel, wherein the first caliper is mounted on the first torque arm, and the first caliper is configured to clamp down on the first and second sides of the first disc in order to slow and/or stop rotation of the first idler wheel.

19. The track assembly of claim 18, wherein the spindle of the first idler wheel is longer than a spindle of a second idler wheel of the track assembly different from the first idler wheel.

20. The track assembly of claim 18, further comprising the first torque arm coupled to the track frame.

* * * * *